Patented Dec. 9, 1930

1,784,617

UNITED STATES PATENT OFFICE

HAROLD E. WOODWARD, OF PENNS GROVE, NEW JERSEY, ASSIGNOR TO E. I. DU PONT DE NEMOURS & COMPANY, OF WILMINGTON, DELAWARE, A CORPORATION OF DELAWARE

TRISAZO DYES AND PROCESS OF PRODUCING THE SAME

No Drawing. Application filed May 31, 1928. Serial No. 282,046.

This invention relates to new and valuable trisazo dyes, which, after being dyed on cotton, may be developed to green tetrakisazo dyes of goods fastness to light and washing. More specifically it relates to trisazo dyes which may be prepared by diazotizing an amino azo compound prepared from an aromatic amino-sulphonic acid and an aromatic amino compound in which coupling can take place in the position para to the amino group, coupling the resulting diazo azo compound to an aromatic amino compound in which coupling can take place in the position para to the amino group, diazotizing and coupling the resulting diazo disazo compound to a para-amino-benzoyl derivative of, or a para-amino-benzoyl-para-amino-benzoyl derivative of, an amino-naphthol-sulphonic acid.

We have found that new and valuable cotton dyes may be thus produced, of the following constitution:

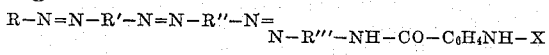

in which R is a radical of an aromatic amino-sulphonic acid and R' and R'' are radicals of aromatic amino compounds in which coupling can take place in the position para to the amino group, R''' is the radical of an amino-naphthol-sulphonic acid, and X is a hydrogen atom or an amino-benzoyl group ($-CO-C_6H_4-NH_2$).

Without limiting the invention to any particular proportions, intermediates or procedure, the following examples are presented to illustrate the application of this invention.

Example 1

The amino azo compound prepared from 25.3 parts of 1:3:6-aniline-disulphonic acid and 22.3 parts of alpha-naphthyl-amine-7-sulphonic acid in a volume of 1200 parts of water is diazotized with 60 parts of 30% hydrochloric acid and 6.9 parts of sodium nitrite at a temperature of 10° C. To this diazo solution is added a solution of 14.3 parts of alpha-naphthylamine dissolved in 300 parts of hot water with 12.0 parts of 30% hydrochloric acid. The coupling is finished in one hour at 10° C., and the free amino group is then diazotized with 6.9 parts of sodium nitrite. The diazo solution is then run into a solution of 37.6 parts of para-amino-benzoyl-2-amino-5-naphthol-7-sulphonic acid and 60 parts of sodium carbonate in 600 parts of water cooled to 0° C. The dye is salted out of solution at 80° C. with about 800 parts of salt. It is then filtered and dried. In the form of its sodium salt it may be represented by the following formula:

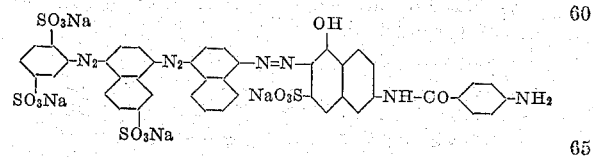

This product is in the form of a dark blue powder, soluble in water with a blue color. Its solution in concentrated sulphuric acid is a violet-black color, and on dilution with water it gives a bluish-violet precipitate. The color dyes cotton a blue color, which after being diazotized and developed with phenyl-methyl-pyrazolone, becomes green. It is then fast to light and to washing.

Example 2

The amino azo compound prepared from 17.3 parts of metanilic acid and 22.3 parts of alpha-naphthylamine-7-sulphonic acid in a volume of 1200 parts of water is diazotized with 60 parts of 30% hydrochloric acid and 6.9 parts of sodium nitrite at 10° C. To this diazo compound is added a solution of the sodium salt of 23.4 parts of alpha-naphthylamine-7-suphonic acid and 14 parts of sodium acetate in 500 parts of water. After the coupling is complete the color is salted out from an alkaline solution with about 500 parts of salt. The color is filtered off and redissolved in 4000 parts of water. It is then diazotized for one hour at 10° C. with 48 parts of 30% hydrochloric acid and 6.9 parts of sodium nitrite and run into a solution of 35.8 parts of para-amino-benzoyl-2-amino-5-naphthol-7-sulphonic acid and 42 parts of sodium carbonate in 300 parts of water cooled to 0° C. The dye is salted out of solution at 80° C. with about 250 parts of salt. It is then filtered and dried. The dried sodium salt is a reddish-black powder, soluble in water with a blue color. Its solution in concentrated sulphuric acid is a dark green color and on dilution with cold water it gives a dark blue precipitate. In the form of its sodium salt it may be represented by the following formula:

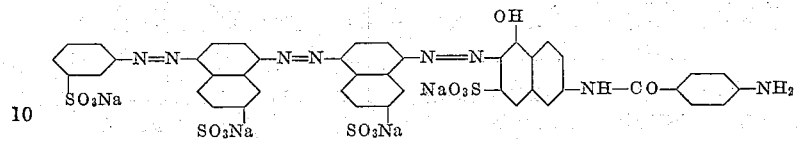

The direct dyeing of this color on cotton is blue. This becomes a bluish-green after it is diazotized and developed with phenyl-methyl-pyrazolone. The constitution of the developed dye may be represented by the following formula:

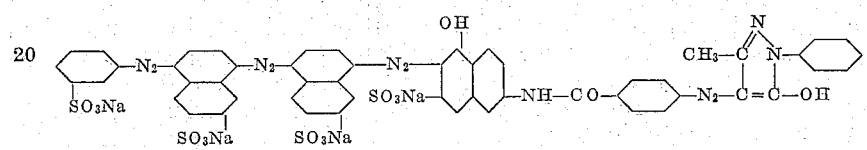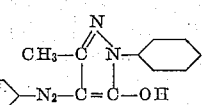

In place of the aniline-disulphonic acid and metanilic acid, used in the examples as first components, other amino-sulphonic acids of the benzene or naphthalene series may be used, as for example, 4-toluidine-5-sulphonic acid, 2-chlor-5-toluidine-4-sulphonic acid, 2-naphthylamine-4:8-disulphonic acid, or H-acid. As second or third components, aromatic amino compounds as alpha-naphthylamine, alpha-naphthylamine-6- or 7-sulphonic acid, or 3-amino-4-cresol-methyl-ether may be used. The fourth component may be the para-amino-benzoyl derivative or the para-amino-benzoyl-para-amino-benzoyl derivative of amino-naphthol-sulphonic acids as, 1-amino-8-naphthol-4-sulphonic acid, 1-amino-8-naphthol-3:6-disulphonic acid, 2-amino-5-naphthol-7-sulphonic acid, or 2-amino-8-naphthol-6-sulphonic acid.

By varying the intermediates within the scope of the appended claims, a large number of valuable trisazo dyes of excellent fastness to light and washing may be prepared.

I claim:

1. The process of preparing a trisazo dye which comprises diazotizing an amino-azo compound prepared from an aromatic amino sulphonic acid and an aromatic amino compound to which coupling can take place in the position para to the amino group, coupling the resulting diazo azo compound to an aromatic amino compound to which coupling can take place in the position para to the amino group, diazotizing and coupling the resulting diazo disazo compound to a compound of the class consisting of para-amino-benzoyl derivatives of, and para-amino-benzoyl-para-amino-benzoyl derivatives of amino-naphthol sulphonic acids.

2. The process of preparing a trisazo dye which comprises diazotizing an amino azo compound prepared by coupling a diazotized compound of the group consisting of aniline disulphonic acid, metanilic acid, 4-toluidine-5-sulphonic acid, 2-chlor-5-toluidine-4-sulphonic acid, 2-naphthylamine-4:8-disulphonic acid and H-acid with a compound of the group consisting of alpha-naphthylamine, alpha-naphthylamine-6-sulphonic acid, alpha-naphthylamine-7-sulphonic acid, and 3-amino-4-cresol-methyl-ether, coupling the resulting diazo azo compound to a compound of the group consisting of alpha naphthylamine, alpha naphthylamine-6-sulphonic acid, alpha naphthylamine-7-sulphonic acid, and 3-amino-4-cresol-methyl-ether, diazotizing the resulting disazo compound and coupling the diazo disazo compound with a compound of the group consisting of para-amino-benzoyl derivatives of, and para-amino-benzoyl-para-amino-benzoyl derivatives of 1-amino-8-naphthol-4-sulphonic acid, 1-amino-8-naphthol-3:6-disulphonic acid, 2-amino-5-naphthol-7-sulphonic acid and 2-amino-8-naphthol-6-sulphonic acid.

3. The process of preparing a trisazo dye which comprises diazotizing an amino azo compound prepared by coupling diazotized 1:3:6-aniline disulphonic acid with alpha naphthylamine-7-sulphonic acid, coupling the resulting diazo azo compound with alpha naphthylamine, diazotizing the resulting disazo compound and coupling with para-amino-benzoyl-2-amino-5-naphthol-7-sulphonic acid.

4. New azo dyes of the type:

$$R-N=N-R'-N=N-R''-N=N-R'''-NH-CO-C_6H_4NH-X$$

in which R is a radical of an aromatic amino-sulphonic acid and R' and R'' are radicals of aromatic amino compounds in which coupling can take place in the position para to the amino group, R''' is the radical of an amino naphthol sulphonic acid, and X is a hydrogen atom or an amino-benzoyl group ($-CO-C_6H_4-NH_2$).

5. New azo dyes of the type:

$$R-N=N-R'-N=N-R''-N=N-R'''-NH-CO-C_6H_4NH-X$$

in which R is the radical of a compound of the group consisting of anilin-disulphonic acid, metanilic acid, 4-toluidine-5-sulphonic acid, 2-chlor-5-toluidine-4-sulphonic acid, 2-naphthylamine-4:8-disulphonic acid and H- acid, R' and R'' are the radicals of a compound of the group consisting of alpha naphthylamine, alpha naphthylamine-6-sulphonic acid, alpha naphthylamine-7-sulphonic acid, and 3-amino-4-cresol-methyl-ether, R''' is a radical of a compound of the group consisting of 1-amino-8-naphthol-4-sulphonic acid, 1-amino-8-naphthol-3:6-disulphonic acid, 2-amino-5-naphthol-7-sulphonic acid and 2-amino-8-naphthol-6-sulphonic acid, and X is a hydrogen atom or an amino-benzoyl group ($-CO-C_6H_4-NH_2$).

6. The new dye:

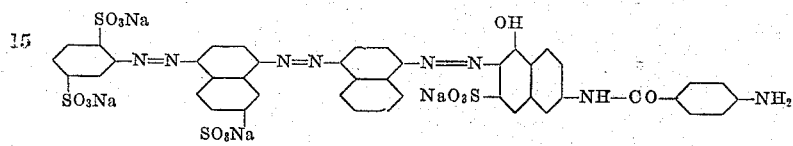

which, when dyed on cotton, diazotized and developed with phenyl-methyl-pyrazolone, gives a green color of good fastness to light and to washing.

7. Textile material dyed with a compound of the type set forth in claim 4.

8. The process of preparing a trisazo dye which comprises diazotizing an amino azo compound prepared by coupling diazotized 1:3:6-aniline disulphonic acid with alpha naphthylamine-7-sulphonic acid, coupling the resulting diazo azo compound with alpha naphthylamine, diazotizing the resulting disazo compound and coupling with p-amino-benzoyl-1-amino-8-naphthol-4-sulphonic acid.

9. The new dye:

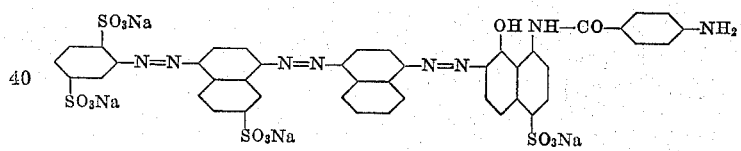

which, when dyed on cotton, diazotized and developed with phenyl-methyl-pyrazolone, gives a bright yellowish green color of good fastness to light and to washing.

10. Textile material dyed with the compound of claim 6.

11. Textile material dyed with the compound of claim 9.

In testimony whereof, I affix my signature.

HAROLD E. WOODWARD.